United States Patent [19]
Mamyshev

[11] Patent Number: 6,141,129
[45] Date of Patent: Oct. 31, 2000

[54] METHOD AND APPARATUS FOR ALL-OPTICAL DATA REGENERATION

[75] Inventor: Pavel Viktorovich Mamyshev, Middletown, N.J.

[73] Assignee: Lucent Technologies Inc., Murray Hill, N.J.

[21] Appl. No.: 08/993,274

[22] Filed: Dec. 18, 1997

[51] Int. Cl.[7] ............................ H04B 10/00; H04B 10/12
[52] U.S. Cl. ........................ 359/176; 359/174; 359/179
[58] Field of Search .................................. 359/174, 179, 359/161, 173, 122

[56] References Cited

U.S. PATENT DOCUMENTS

| | | | |
|---|---|---|---|
| 5,760,948 | 6/1998 | Bigo | 359/326 |
| 5,911,015 | 6/1999 | Bigo | 385/1 |

OTHER PUBLICATIONS

Bigo, Sebastien. "All–Optic Fiber Signal Processing and Regeneration for Soliton Communications", Oct. '97 IEEE Journal of Selected Topics In Quantam Electronics, vol. 3 No. 5, pp. 1208–1223.

Nakazawa M. "40 Gbit/s WDM soliton transmission over 10000 km using synchronous modulation and narrow band optical filtering", Apr. '96, Electronic Letters, vol. 32 No. 9, pp. 828–829.

Primary Examiner—Leslie Pascal
Assistant Examiner—Agustin Bello
Attorney, Agent, or Firm—Gibbons, Del Deo, Dolan, Griffinger & Vecchione

[57] ABSTRACT

The specification relates to a method and apparatus for all-optical regeneration of return-to-zero (RZ) data streams. The effect of self-phase modulation (SPM) of a data signal passing through a nonlinear medium (NLM) creates spectral broadening in individual data pulses which are then subsequently filtered to pass a selected bandwidth centered at a frequency, $\omega_f$, which is shifted with respect to the input data carrier frequency, $\omega_0$. Since the degree of broadening of a pulse passing through the NLM is a function of the initial intensity of the pulse, noise in data "zeros" (null values) possess insufficient intensity (providing incidental distortion pulse intensity attributable to accumulated process noise is less than a critical value) to cause the requisite amount of spectral broadening to encompass the selected filter bandwidth centered around $\omega_f$, and the noise is subsequently suppressed. Conversely, noise (amplitude fluctuations) in data "ones" (set values) possess sufficient intensity (providing input pulse intensity, including incidental distortion pulse intensity, is greater than a critical value) to cause the requisite amount of spectral broadening to encompass the selected filter bandwidth centered around $\omega_f$, and that portion of the spectrally broadened pulse contained within the bandwidth centered around $\omega_f$ is subsequently passed.

22 Claims, 6 Drawing Sheets

METHOD AND APPARATUS FOR ALL-OPTICAL DATA REGENERATION

FIELD OF THE INVENTION

The present invention generally relates to optical data regeneration. More particularly, the present invention relates to regeneration of data within a return-to-zero optical data stream by utilizing the effects of self-phase modulation of a data signal through a nonlinear medium.

BACKGROUND OF THE INVENTION

Whenever a digital optical data signal is generated, transmitted, switched, multiplexed, demultiplexed, or otherwise processed, the signal invariably is subject to some degree of distortion. Distortion is typically cumulative and if the original signal is not periodically restored, data can become riddled with errors or become completely incomprehensible. Regenerators are utilized to provide this periodic restoration and restore the quality of the original data signal. Typically, regenerators are complicated and expensive opto-electronic devices, in which optical data is converted to an electrical signal, the signal is amplified and restored, and then the signal is converted back to an optical form.

Advances have recently been made in an attempt to produce an all-optical regenerator which does not require conversion of a data signal from optical to electronic and back to optical. In a published letter entitled "10 Gbit/s Soliton Data Transmission Over One Million Kilometres," M. Nakazawa, E. Yamada, H. Kubota, and K. Suzuki, *Electronics Letters* 27, 1270–1272 (1991) a method is suggested in which in-line amplitude modulation of a signal at the bit-rate frequency acts as a regenerator distributed over the transmission line (local clock recovery is required in conjunction with this technique). A published letter entitled "All-Optical Signal Regenerator," J. K. Lucek and K. Smith, *Optics Letters* 13, 1226–1228 (1993) demonstrates a method for all-optical data regeneration (also requiring local clock recovery) utilizing a nonlinear optical loop mirror as described in "Nonlinear-Optical Loop Mirror," N. J. Doran and D. Wood, *Optics Letters* 13, 56–58 (1988). Utilizing the technique of soliton transmission with sliding-frequency guiding filters, as revealed in "The Sliding-Frequency Guiding Filter: An Improved Form of Soliton Jitter Control," L. F. Mollenauer, J. P Gordon, and S. G. Evangelides, *Optics Letters* 17, 1575–1577 (1992), the transmission line itself can be considered as an all-optical passive regenerator for a soliton pulse. This method is compatible with wavelength-division multiplexing and is characterized by an essentially ideal intensity transfer function, as described in "WDM Channel Energy Self-Equalization in a Soliton Transmission Line by Guiding Filters," P. V. Mamyshev and L. F. Mollenauer, *Optics Letters* 21, 1658–1660 (1996).

Therefore, there is a need for an all-optical digital data signal regenerator which does not require local clock recovery, and which is equally functional when utilized in conjunction with signal waveshapes other than solitons.

SUMMARY OF THE INVENTION

The present invention is a method and apparatus utilized for all-optical regeneration of return-to-zero (RZ) data streams applicable to soliton as well as non-soliton pulses and capable of operation without the use of local clock recovery. The present invention utilizes the effect of self-phase modulation (SPM) of a data signal in a nonlinear medium (NLM) to provide a spectral broadening of individual data pulses and then subsequently filters broadened pulses, passing only those pulses within a selected bandwidth centered at a frequency, $\omega_f$, which is shifted with respect to the input data carrier frequency, $\omega_0$. Since the degree of broadening of a pulse passing through the NLM is a function of the initial intensity of the pulse, noise in data "zeros" (null values) possess insufficient intensity (providing incidental distortion pulse intensity attributable to accumulated process noise is less than a critical value) to cause the requisite amount of spectral broadening to encompass the selected filter bandwidth centered around $\omega_f$, and the noise is subsequently suppressed. Conversely, noise (amplitude fluctuations) in data "ones" (set values) possess sufficient intensity (providing input pulse intensity, including incidental distortion pulse intensity, is greater than a critical value) to cause the requisite amount of spectral broadening to encompass the selected filter bandwidth centered around $\omega_f$, and that portion of the spectrally broadened pulse contained within the bandwidth centered around $\omega_f$ is subsequently passed.

The present invention creates output pulses that are nearly transform limited. The result is a transfer function (output pulse intensity versus input pulse intensity) that is nearly ideal (a binary, bipolar transfer function characterized by a discontinuity at the critical intensity value). The characteristic of a nearly ideal transfer function is responsible for restoration of amplitude uniformity in restored set pulses, since the transfer function is nearly flat for input pulse intensity values greater than the critical intensity value.

Advantageously, the present invention is an elegant and inexpensive device to produce; the essential components being a NLM (such as a length of optical fiber) and an optical bandpass filter. Consequently, since the individual components are essentially durable and reliable, the present invention itself is also durable and reliable.

In one alternative embodiment of the present invention, a plurality of optical bandpass filters are utilized after passing the input data stream through a NLM, thereby providing a plurality of regenerated signal outputs having a respective plurality of output signal wavelengths.

In another alternative embodiment of the present invention, a noise rejecting optical bandpass filter is utilized to suppress broadband spectral noise prior to passing the input data stream through a NLM.

In yet another alternative embodiment of the present invention, an optical amplifier is utilized prior to subjecting the input data stream through a NLM, thereby providing an input signal pulse intensity adequate to cause sufficient signal spectral bandwidth broadening within the NLM.

Further alternative embodiments of the present invention will be described in conjunction with the remainder of the specification, wherein the detailed description is for the purpose of fully disclosing the invention without placing limitation thereon.

BRIEF DESCRIPTION OF THE DRAWINGS

A more complete understanding of the present invention may be obtained from consideration of the following description in conjunction with the drawings in which.

DETAILED DESCRIPTION

Figure 1:
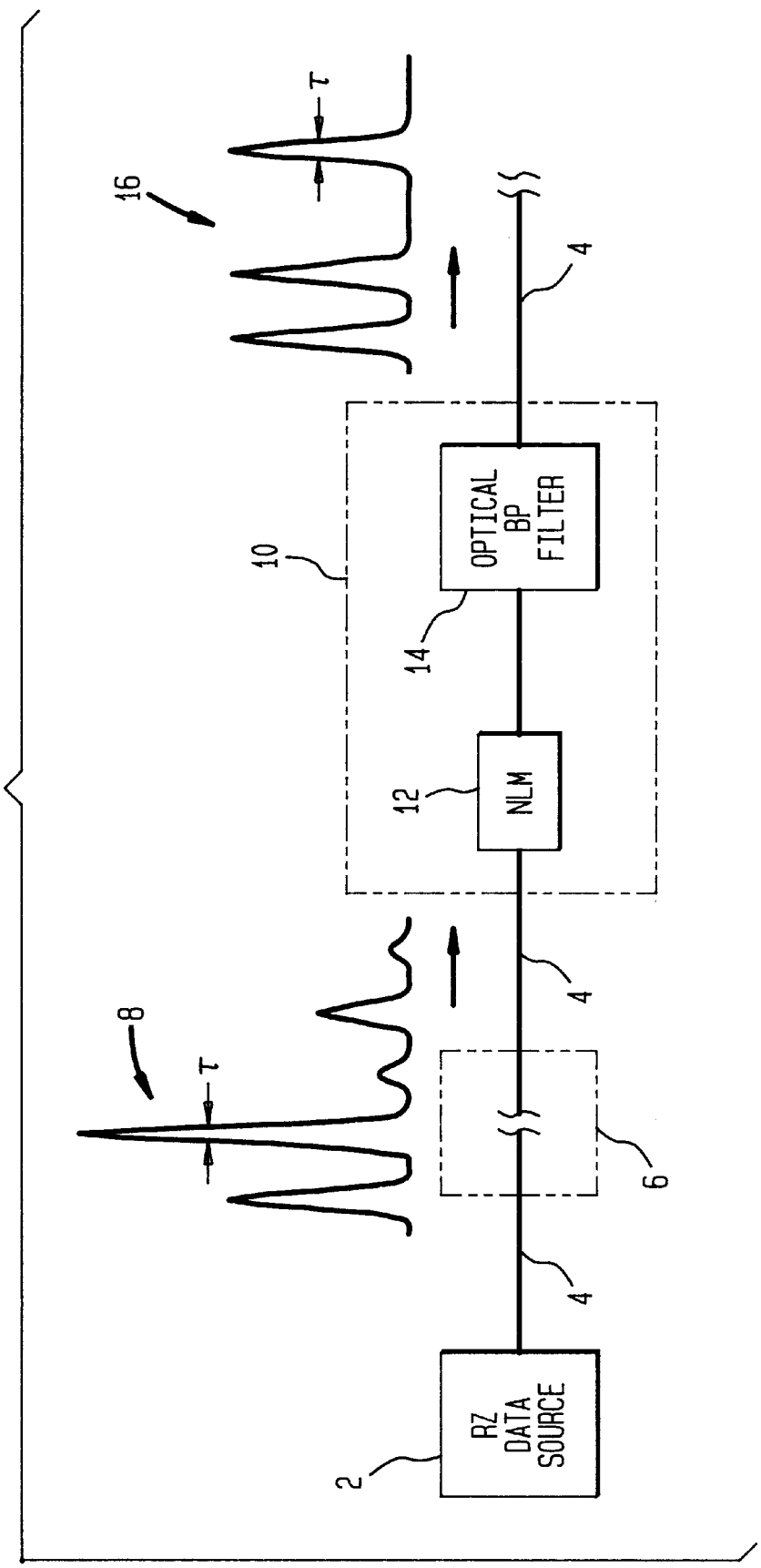
FIG. 1 is a diagram of an exemplary all-optical signal regenerator, in accordance with the present invention, illustrating typical signal distortion at the regenerator input and regenerated signal output from the regenerator.

FIG. 1 is a diagram of an exemplary all-optical signal regenerator, in accordance with the present invention. The all-optical signal regenerator suppresses the noise from signal "zeros" and minimizes variations in amplitude from signal "ones" for return-to-zero (RZ) data streams. Therefore, a signal transmitting source 2 is shown as an RZ data source. The signal transmitting source 2 transmits an optical data stream over a transmission medium 4. The transmission medium 4 is typically a optical fiber medium, however, any optical transmission medium is contemplated for use with the present invention, as would be apparent to those skilled in the art. System distortion sources 6 include the transmission medium, switches, couplings, multiplexers, demultiplexers, or any other device known to those skilled in the art to cause signal degradation. Distortion is represented by an input signal 8 to an all-optical regenerator 10. The all-optical regenerator 10 produces an output signal 16 with noise suppressed and the variations in amplitude of signal "ones" minimized. The all-optical regenerator 10 is comprised of a minimum of two components; a nonlinear medium (NLM) 12 and an optical regenerator bandpass filter (ORBPF) 14.

The choice of bandpass frequency for the optical regenerator bandpass filter 14 with respect to the selection of NLM 12 utilized is crucial to and the focus of the present invention. The present invention utilizes the effect of self-phase modulation (SPM) of the data signal in the NLM 12 with subsequent optical filtering at a frequency ($\omega_f$) which is shifted with respect to the input data carrier frequency ($\omega_0$). Signal output pulses are essentially transform-limited and the resultant transfer function (i.e.—output pulse intensity versus input pulse intensity) is essentially a binary function. It should be noted that SPM of the data signal can occur within an optical fiber (which may encompass the transmission medium 4 in whole or part) or any other nonlinear material as would be apparent to those skilled in the art.

The concept of utilizing the effect of self-phase modulation in conjunction with the present invention accomplishes signal regeneration in the following manner. Input signal 8 pulses possess a spectral bandwidth of $\Delta\omega_0$, which is approximately equal to the quantity associated with inverse pulsewidth (i.e., $\Delta\omega_0 \sim 1/\tau$, where $\tau$ is input signal pulsewidth). Due to the effect of SPM, the spectral bandwidth of the pulses broadens as they are conveyed over the nonlinear medium (NLM) 12 of the present invention. The equation describing the broadened signal bandwidth as a result of self-phase modulation (SPM) is $$\Delta\omega_{SPM} = \Delta\omega_0 \frac{2\pi}{\lambda} n_2 I_p L \quad [1]$$

where $I_p$ is the input signal 8 pulse intensity (which may vary from pulse to pulse for a given input signal 8 due to previously introduced distortion), $n_2$ is the nonlinear refractive index, $\lambda$ is input signal 8 wavelength, L is the length of the nonlinear medium 12, $\Delta\omega_{SPM}$ is the spectral bandwidth of the broadened signal as a result of self-phase modulation (SPM), $\omega_0$ is the center carrier frequency of the input signal 8, and $\Delta\omega_0$ is the bandwidth of the input signal 8.

After transport through the nonlinear medium (NLM) 12, the pulses pass through an optical regenerator bandpass filter (ORBPF) 14. The center frequency of the ORBPF 14, $\omega_f$, is selected at a frequency other than the input signal carrier frequency, $\omega_0$; the relationship between ORBPF frequency, input signal carrier frequency, and the relative frequency shift ($\omega_{shift}$) between the two described by the equation $$\omega_f = \omega_0 + \Delta\omega_{shift} \quad [2]$$

If the spectral broadening described in equation [1] is small enough for a particular pulse, that is when, $$\frac{\Delta\omega_{SPM}}{2} < \Delta\omega_{shift} \quad [3]$$

then the pulse is rejected as noise by the optical regenerator bandpass filter 14 and will not be passed on. This occurs because according to equation [1], the self-phase modulation bandwidth is proportional to input signal pulse intensity, $I_p$; therefore, the greater the pulse intensity, the greater spectral broadening associated with a pulse as it propagates through the NLM 12. Those pulses conforming to the constriction of equation [3], therefore have an input signal pulse intensity too small to be a data "one" (set value) and are regenerated as a data "zero" (null value), because the spectral broadening imposed upon the pulse as it transits the NLM 12 is insufficient to extend into the frequency region being passed by the optical regenerator bandpass filter 14. The relationship between $\Delta\omega_{SPM}$ and $\Delta\omega_{shift}$ is fixed, as can be discerned in equation [3]. Since $\Delta\omega_{SPM}$ represents the entire spectral bandwidth of the broadened pulse, half that amount represents the required spectral bandwidth for $\Delta\omega_{shift}$, since a shift may occur on either side of the center frequency associated with the self-phase modulation bandwidth.

If the input signal pulse intensity, $I_p$, is great enough so that $$\frac{\Delta\omega_{SPM}}{2} \geq \Delta\omega_{shift} \quad [4]$$

then a portion of the SPM broadened spectrum passes through the optical regenerator bandpass filter. The spectral bandwidth of the filtered pulse is determined by the filter spectral bandwidth, $\Delta\omega_f$. As is subsequently described and developed herein, for a wide range of parameters, the filtered pulse is essentially a transform-limited pulse in the time domain. By selectively choosing the filter spectral bandwidth, $\Delta\omega_f$, an appropriate adjustment in the output pulsewidth is concomitantly made. Therefore, preservation of the value of an original pulsewidth ($\Delta\omega_0 \sim \Delta\omega_f$), if desired, is maintained via the selection of the filter spectral bandwidth. Intensity of the output filtered pulse is proportional to the spectral density of the SPM-broadened spectrum at the output of the nonlinear medium 12, $I_\rho = dI/d\omega$. From equation [1], it can be estimated that $$I_\omega \sim I_p / \Delta\omega_{SPM} = \frac{\lambda}{\Delta\omega_0 2\pi n_2 L} \quad [5]$$

Therefore, $I_\omega$, and consequently the intensity of the regenerator output pulse, are independent of the input pulse intensity ($I_p$), if the magnitude of $I_p$ is great enough to meet the condition of equation [4]. As a result, a pulse transfer function is established in accordance with the present invention, which relates the pulse intensity of an input signal 8 to the pulse intensity of an output signal 16, so that:

$$I_{out}=0, \text{ if } I_p < I_{CR} \quad [6a]$$

$$I_{out}=\text{const, if } I_p > I_{CR} \quad [6b]$$

where the critical pulse intensity, $I_{CR}$, is determined from $\Delta\omega_{SPM}/2 = \Delta\omega_{shift}$:

$$I_{CR} = \frac{2\Delta\omega_{shift}}{\Delta\omega_0 \frac{2\pi}{\lambda} n_2 L} \quad [7]$$

The transfer function of equation [6] is an ideal transfer function for a regenerator; since intensity distortions manifested as noise in "zeros" are removed [6a], and intensity distortions manifested as amplitude jitter in "ones" are suppressed [6b].

An exemplary embodiment of the present invention utilizing numerical values is subsequently considered. Silica fiber is selected as the nonlinear material (NLM) 12, having a refractive index of $n_2=2.6\times10^{-16}$ cm$^2$/W and a length of L=15 km. An input signal wavelength of $\lambda=1.55$ $\mu$m is utilized with a ratio between relative frequency shift and input signal spectral bandwidth of $\Delta\omega_{shift}/\Delta\omega_0=2.38$. The instant embodiment has a critical pulse intensity of $I_{CR}=3\times10^5$ W/cm$^2$, and for a fiber with an effective core area of 35 $\mu$m$^2$, the corresponding peak power is 100 mW For a data stream with a period-to-pulse duration ratio of T/$\tau$=5, the corresponding critical value for the average data signal power is 10 mW The average data signal power is typically operated at several times this critical value, on the order of $P_{data,ave}$=30–40 mW, which is easily obtainable from an erbium-doped fiber amplifier. The average data signal power value does not depend upon the data bit-rate.

Figure 2:
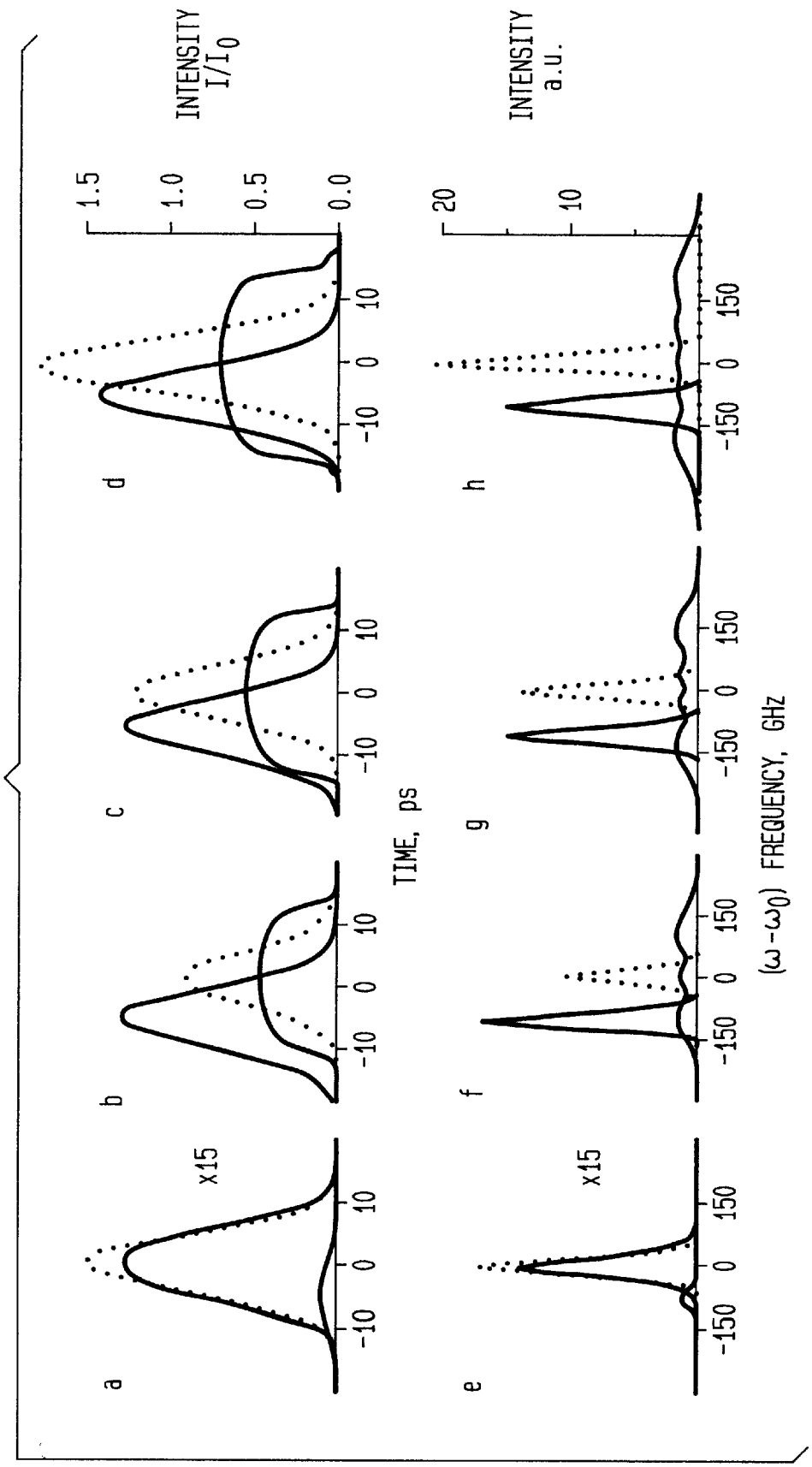
FIGS. 2a–h represent exemplary temporal intensity profiles and corresponding spectra for varying input pulse intensities, in accordance with the present invention.
Figure 3:
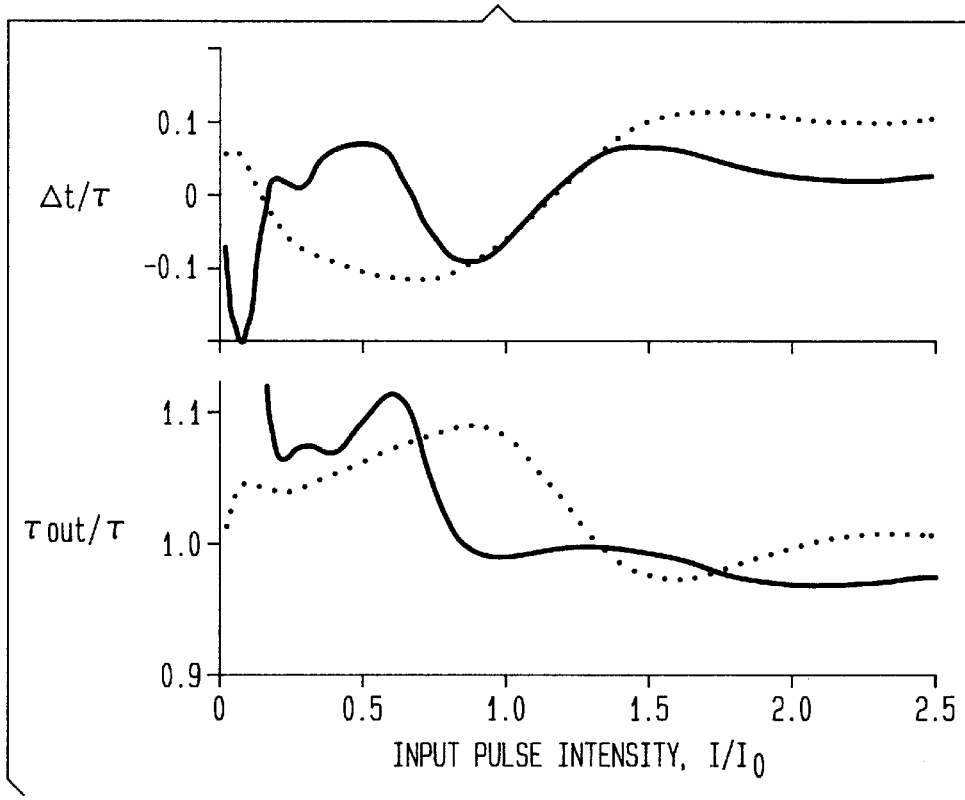
FIG. 3 is a graphical representation of pulse bandwidth variation and time position variation between input pulses and regenerated pulses as a function of input pulse intensity, in accordance with the present invention.
Figure 4:
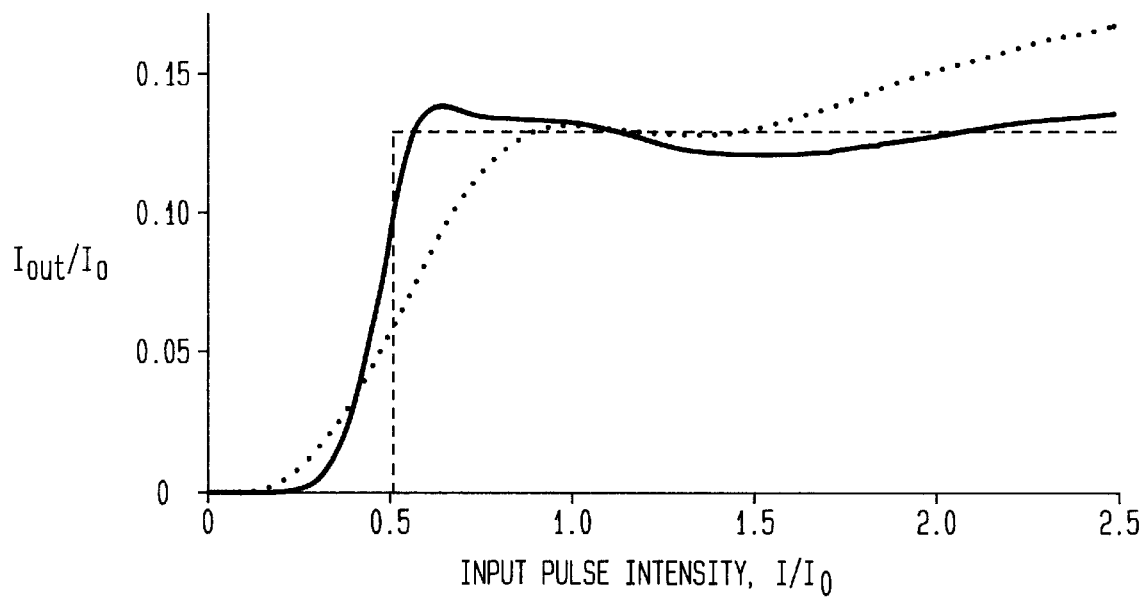
FIG. 4 is a graph representing the transfer functions, in accordance with the present invention, for a single-stage regenerator and a two-stage regenerator, and comparing those transfer functions with an ideal transfer function.

The description pertaining to the instant embodiment of the present invention heretofore did not specify the magnitude and sign of dispersion for the NLM 12 used. The present invention is operable with positive, negative, and null-valued dispersion. However, a small negative (non-soliton) dispersion (D<0) is advantageously utilized in one embodiment of the present invention, since utilizing a small negative magnitude for dispersion results in an SPM-broadened pulse spectra having a more distinctly level peak during the duration of the pulse. This constraint results in obtaining a transfer function more closely approximating the ideal function described in equation [6] for those pulses having an input signal 8 pulse intensity greater than the critical pulse intensity ($I_{CR}$). FIGS. 2–4 demonstrate the performance of the instant exemplary embodiment of the present invention, utilizing the previously disclosed numerical values, a negative value of D, and the common parameters of a dispersion length of $z_d = (2\pi c 0.322\tau^2)/(\lambda|D|)$, a nonlinear material length of $z_{NL} = [(2\pi/\lambda)n_2 I_0]^{-1}$, $z_{NL}/z_d = 0.015$, $L/z_{NL}=12$, a spectral bandwidth (FWHM) for a Gausian BPF of $\Delta\omega_f/2\pi=0.45/\tau$, and $\Delta\omega_{shift}\tau/2\pi=-1.05$. The normalization pulse peak intensity is $I_0=2.5(I_{CR})$.

FIGS. 2a–h represent exemplary temporal (time domain) intensity profiles and corresponding spectra (frequency domain profiles) for varying input pulse intensities, in accordance with the present invention. FIG. 2 contemplates a pulse duration of $\tau$=10 ps. Time domain intensity profiles are represented by FIGS. 2a–d. Corresponding frequency domain intensity profiles are represented (immediately below their respective time domain profiles) by FIGS. 2e–h. Input pulses are represented with dashed lines, pulses at the nonlinear material (fiber) output are represented with solid lines, and regenerated pulses after having passed through the optical regenerator bandpass filter are represented with bold solid lines. Various input signal pulse intensities ($I_p$) are presented to demonstrate the regenerating characteristics of the present invention in suppressing pulses attributable purely to noise and in restoring distorted pulses to an essentially uniform intensity. Specifically, FIGS. 2a,b represent the intensity profiles for pulses characterized by $I_p=0.1(I_0)$, FIGS. 2b,f represent the intensity profiles for pulses characterized by $I_p=0.9(I_0)$, FIGS. 2c,g represent the intensity profiles for pulses characterized by $I_p=1.2(I_0)$, and FIGS. 2d,h represent the intensity profiles for pulses characterized by $I_p=1.8(I_0)$. Regenerated pulses (represented with bold solid lines) are shown subsequently amplified by a factor of ten. The intensity scale utilized is common for each value of $I_p$ with the exception of the instance when $I_p=0.1(I_0)$, in which case the vertical scales are expanded, for the purpose of clarity, by a factor of fifteen.

When an input pulse intensity is small, that is less than $I_{CR}$ (FIGS. 2a,e), the spectral broadening is insignificant and, as a result, the pulse after spectral filtering is essentially zero. This type of input pulse intensity is indicative of the presence of noise when a signal "zero" is distorted. Therefore, the regenerator effectively suppresses the noise in signal "zeros," returning the pulse value to a null value. In contrast, when the input pulse intensity is greater than $I_{CR}$ (FIGS. 2b–d,f–h), the pulse spectrum broadens. Pulse spectrum broadening into the region in which the filter spectrum bandwidth ($\Delta\omega_f$) is selected results in a regenerated pulse being produced (pulse is set) at a shifted center frequency of $\omega_f$ rather than the original input data carrier center frequency of $\omega_0$. SPM-broadened spectra are characterized as having essentially constant flat-top shapes and the spectral density (height of the spectra) is nearly independent of the input pulse intensity (equation [5]). In accordance with the instant embodiment of the present invention, utilizing parameters previously described in accordance with the numerical example, regenerated pulses possess nearly Gaussian form. However, the output of the regenerator is capable of producing waveforms other than Gaussian by altering the shape of the optical bandpass filter, as would be apparent to those skilled in the art.

FIG. 3 is a graphical representation of pulse bandwidth variation and time position variation between input pulses and regenerated pulses as a function of input pulse intensity, in accordance with the present invention and utilizing the previously disclosed numerical values, common parameters, and a negative value of D. Single stage regeneration response is shown utilizing dashed curves. Alternative embodiments of the present invention, subsequently considered, utilize two or more regenerators coupled in series. Therefore, regeneration response for a two-stage regenerator is shown utilizing a solid curve. In the case of the two-stage regenerator response curve, the signal is amplified by a factor of ten after being processed by the initial stage.

The bandwidth of the ORBPF in the present embodiment is chosen so that the width of regenerated pulses is essentially equal to that of the input pulses, as demonstrated by the graphical representation of $\Delta t/\tau$ versus input pulse intensity. However, alternative embodiments may vary the width of regenerated pulses in relation to the width of input pulses, as would be apparent to those skilled in the art. Time position variation of the regenerated pulses, induced by fluctuations in the input pulse intensity, is small (less than ±10% of the pulsewidth $\tau$, as demonstrated by the graphical representation of $\tau_{out}/\tau$ versus input pulse intensity.

FIG. 4 is a graph representing the transfer functions for a single-stage regenerator and a two-stage regenerator, in accordance with the present invention, utilizing the previously disclosed numerical values, common parameters, and a negative value of D. An ideal transfer function is also shown for purposes of comparison. The ideal transfer function is characterized by a bipolar value discontinuity, as would be predicted in accordance with ideal transfer function equation [6]. The transfer function for a single-stage regenerator is represented by the dashed curve. The transfer function for a two-stage regenerator is represented by the solid curve. Although the transfer function for a two-stage regenerator more closely approximates an ideal transfer function, both single-stage and two-stage regenerators offer performance reasonably close to ideal.

The present invention is also operable as a wavelength converter. Since the present invention produces a filtered, regenerated pulse at a frequency other than the input data carrier frequency ($\omega_0$), a single-stage regenerator necessarily operates as a wavelength converter. For those regeneration applications in which preservation of the original input data carrier frequency ($\omega_0$) is desired, a regenerator having two or more stages is utilized. Using a second regeneration stage possessing the same magnitude of frequency shift as the first stage, but an opposite sign for the frequency offset results in a net frequency offset of zero. That is, choosing an ORBPF in the second-stage regenerator so that $$\Delta\omega_{shift1}=-\Delta\omega_{shift2} \qquad [8]$$

restores the original data carrier frequency ($\omega_0$) as the output frequency of the second-stage regenerator. The solid curves of FIGS. 3–4, as previously described, illustrate the results for a two-stage implementation. As would be expected, the performance characteristics of the two-stage regenerator are improved over those of a single-stage regenerator. Referring again to FIG. 4, it is of particular importance that the transfer function for the two-stage regenerator (solid curve) nearly approximates the ideal transfer function (dashed curve).

The present invention for signal regeneration does not directly correct for timing jitter of an input signal. Advantageously, however, since the output carrier frequency of signal data is controlled by the selection of the ORBPF, the regenerator indirectly suppresses the carrier frequency jitter. This characteristic translates into the capability to suppress the timing jitter caused by frequency fluctuations in the data pulses as well.

An alternative embodiment of the present invention utilizes a plurality of optical regenerator bandpass filters after subjecting the input signal to SPM bandwidth broadening through the nonlinear material, thereby creating two or more regenerated signals simultaneously at different output wavelengths. An embodiment illustrating this feature is presented subsequently.

Yet other alternative embodiments of the present invention utilize an optical bandpass filter centered at the input pulse signal frequency ($\omega_0$) to initially process an input signal prior to passing the signal through the NLM. Such a scheme is used when the signal stream to be regenerated contains spectrally broad noise, thereby passing only that frequency corresponding to the input pulse signal frequency ($\omega_0$) and rejecting noise outside the signal spectrum. Embodiments illustrating this feature are presented subsequently.

Figure 5:
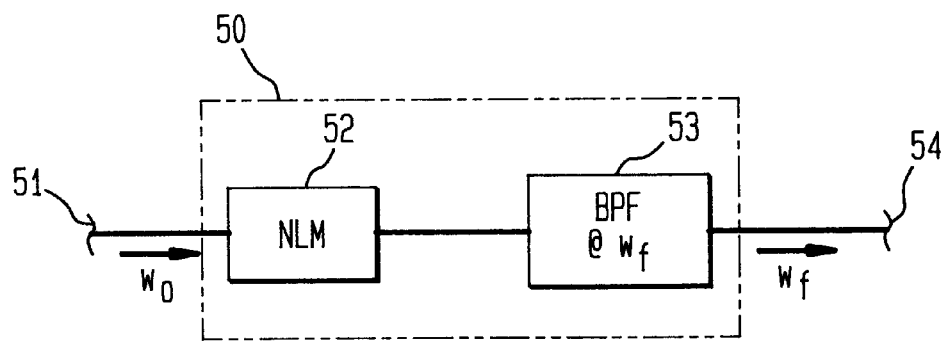
FIG. 5 is a diagram of an exemplary embodiment of an all-optical signal regenerator.

FIG. 5 is a diagram of an exemplary embodiment of an all-optical signal regenerator 50. Regenerator signal inlet port 51 is coupled to receive a return-to-zero (RZ) optical data stream from a transmission medium. The transmission medium is typically a optical fiber medium, however, any optical transmission medium is contemplated for use with the present invention, as would be apparent to those skilled in the art. Non-optical transmission mediums may also utilize the present invention, however, conversion of the transmitted data stream to an optical data stream is required prior to regeneration. The regenerator signal inlet port 51 is coupled to the inlet of a nonlinear medium (NLM) 52. The nonlinear material used as a NLM 52 may be selected from any of a number of nonlinear transmission materials, including but not limited to optical fiber and semiconductor materials. Nonlinear material is selected since signals transmitted thereover are subject to spectral bandwidth broadening due to self-phase modulation (SPM). The outlet of the NLM 52 is coupled to the inlet of an optical regenerator bandpass filter (ORBPF) 53 having a center frequency of $\omega_f$. The outlet of the ORBPF 53 is then coupled to a regenerator signal outlet port 54.

The regenerator signal inlet port 51 receives a RZ optical data stream, at an input signal carrier frequency ($\omega_0$), from the transmission medium. The NLM 52 over which the data stream is transmitted produces an SPM-broadened spectrum centered around $\omega_0$ which is then subjected to the ORBPF 53 with center frequency $\omega_f$. The output of the ORBPF is coupled to the regenerator signal outlet port 54.

Figure 6:
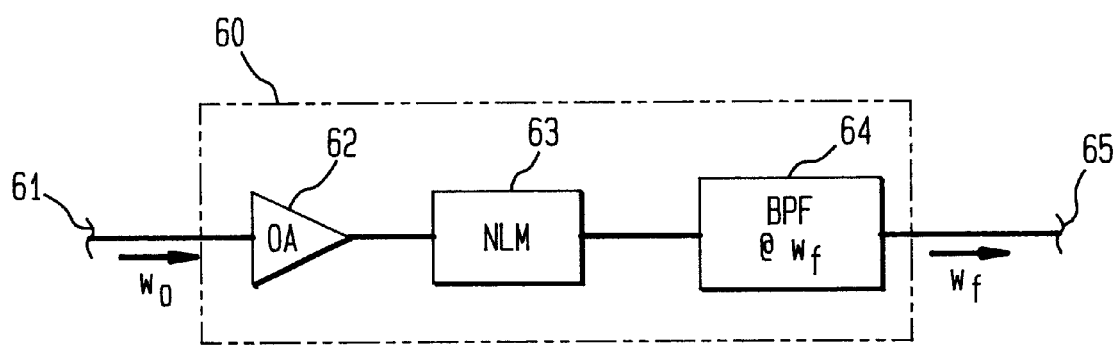
FIG. 6 is a diagram of an exemplary embodiment of an all-optical signal regenerator which incorporates an optical amplifier.

FIG. 6 is a diagram of an exemplary embodiment of an all-optical signal regenerator 60 incorporating an optical amplifier. Regenerator signal inlet port 61 is coupled to receive a RZ optical data stream from a transmission medium. The regenerator signal inlet port 61 is coupled to the inlet of an optical amplifier 62 and the outlet of the optical amplifier 62 is coupled to of the inlet of a NLM 63. The outlet of the NLM 63 is coupled to the inlet of an ORBPF 64 with a center frequency of $\omega_f$. The output of the ORBPF 64 is then coupled to a regenerator signal outlet port 65.

The regenerator signal inlet port 61 receives a RZ optical data stream, at an input signal carrier frequency ($\omega_0$), from the transmission medium. The optical amplifier 62 amplifies the input signal data stream so that input signal pulse intensity is sufficient to create adequate SPM induced spectrum broadening when transported within a nonlinear material. The NLM 63, over which the data stream is transmitted, produces an SPM-broadened spectrum, centered around $\omega_0$, which is then subjected to the ORBPF 64 with center frequency $\omega_f$. The output of the BPF is coupled to the regenerator signal outlet port 65.

Figure 7:
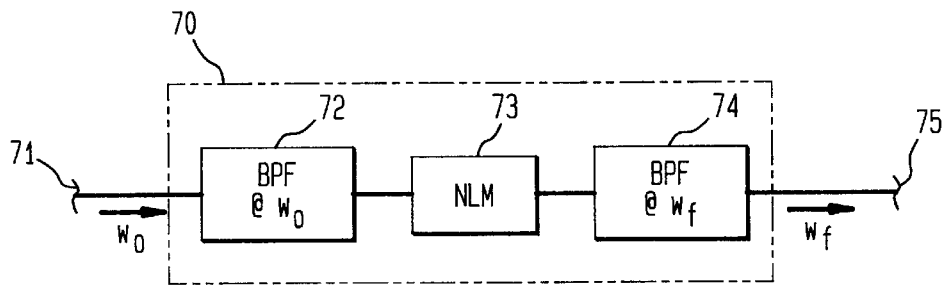
FIG. 7 is a diagram of an exemplary embodiment of an all-optical signal regenerator incorporating an optical filter centered at input signal frequency.

FIG. 7 is a diagram of an exemplary embodiment of an all-optical signal regenerator 70 incorporating a noise-rejecting optical bandpass filter (NROBPF) centered at input signal frequency. Regenerator signal inlet port 71 is coupled to receive a RZ optical data stream from a transmission medium. The regenerator signal inlet port 71 is coupled to the inlet of an NROBPF 72 centered at $\omega_0$ and the outlet of the NROBPF 72 centered at $\omega_0$ is coupled to the inlet of a NLM 73. The outlet of the NLM 73 is coupled to the inlet of an ORBPF 74 with a center frequency of $\omega_f$. The output of the ORBPF 74 centered at $\omega_f$ is then coupled to a regenerator signal outlet port 75.

The regenerator signal inlet port 71 receives a RZ optical data stream, at an input signal carrier frequency ($\omega_0$), from the transmission medium. The NROBPF 72 centered at $\omega_0$ is incorporated within the instant embodiment to suppress spectrally broad noise outside the signal spectrum. The NLM 73, over which the data stream is transmitted, produces an SPM-broadened spectrum, centered around $\omega_0$, which is then subjected to the ORBPF 74 with center frequency $\omega_f$. The output of the ORBPF 74 centered around $\omega_f$ is coupled to the regenerator signal outlet port 75.

Figure 8:
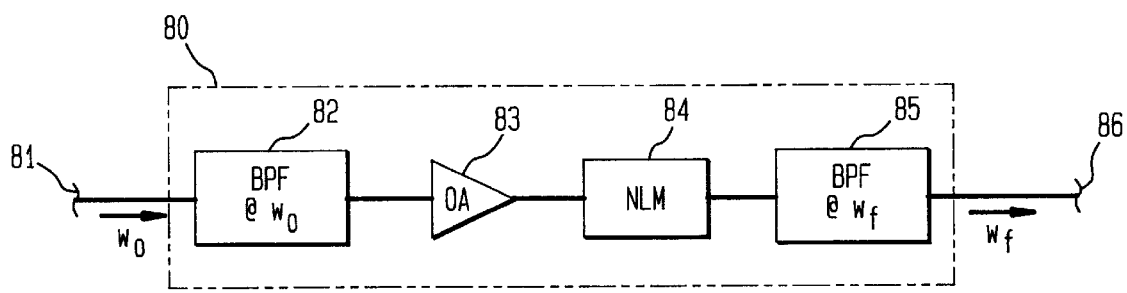
FIG. 8 is a diagram of an exemplary embodiment of an all-optical signal regenerator incorporating an optical filter centered at input signal frequency and a subsequent optical amplifier.

FIG. 8 is a diagram of an exemplary embodiment of an all-optical signal regenerator 80 incorporating an optical amplifier with a preceding NROBPF centered at input signal frequency. Regenerator signal inlet port 81 is coupled to receive a RZ optical data stream from a transmission medium. The regenerator signal inlet port 81 is coupled to the inlet of an NROBPF 82 centered at $\omega_0$ and the outlet of the NROBPF 82 centered at $\omega_0$ is coupled to the inlet of an optical amplifier 83. The outlet of the optical amplifier 83 is coupled to the inlet of a NLM 84. The outlet of the NLM 84 is coupled to the inlet of an ORBPF 85 with a center frequency of $\omega_f$. The output of the ORBPF 85 centered at $\omega_f$ is then coupled to a regenerator signal outlet port 86.

The regenerator signal inlet port 81 receives a RZ optical data stream, at an input signal carrier frequency ($\omega_0$), from the transmission medium. The NROBPF 82 centered at $\omega_0$ is incorporated within the instant embodiment to suppress spectrally broad noise outside the signal spectrum. The optical amplifier 83 amplifies the input signal data stream so that input signal pulse intensity is sufficient to create adequate SPM induced spectrum broadening when transported within a nonlinear material. The NLM 84, over which the data stream is transmitted, produces an SPM-broadened spectrum, centered around $\omega_0$, which is then subjected to the ORBPF 85 with center frequency $\omega_f$. The output of the BPF 85 centered around $\omega_f$ is coupled to the regenerator signal outlet port 86.

Figure 9:
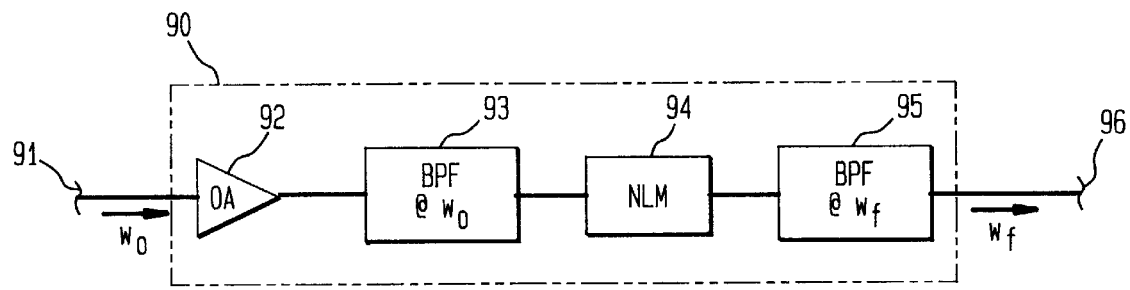
FIG. 9 is a diagram of an exemplary embodiment of an all-optical signal regenerator incorporating an optical amplifier and a subsequent optical filter centered at input signal frequency.

FIG. 9 is a diagram of an exemplary embodiment of an all-optical signal regenerator 90 incorporating an optical amplifier with a subsequent optical filter centered at input signal frequency. Regenerator signal inlet port 91 is coupled to receive a RZ optical data stream from a transmission medium. The regenerator signal inlet port 91 is coupled to the inlet of an optical amplifier 92. The outlet of the optical amplifier 92 is coupled to the inlet of a NROBPF 93 centered at $\omega_0$. The outlet of the NROBPF 93 centered at $\omega_0$ is coupled to the inlet of a NLM 94. The outlet of the NLM 94 is coupled to the inlet of an ORBPF 95 with a center frequency of $\omega_f$. The output of the ORBPF 95 centered at $\omega_f$ is then coupled to a regenerator signal outlet port 96.

The regenerator signal inlet port 91 receives a RZ optical data stream, at an input signal carrier frequency ($\omega_0$), from the transmission medium. The optical amplifier 92 amplifies the input signal data stream so that input signal pulse intensity is sufficient to create adequate SPM induced spectrum broadening when transported within a nonlinear material. The NROBPF 93 centered at $\omega_0$ is incorporated within the instant embodiment to suppress spectrally broad noise outside the signal spectrum. The NLM 94, over which the data stream is transmitted, produces an SPM-broadened spectrum, centered around $\omega_0$, which is then subjected to the ORBPF 95 with center frequency $\omega_f$. The output of the ORBPF 95 is coupled to the regenerator signal outlet port 96.

Figure 10:
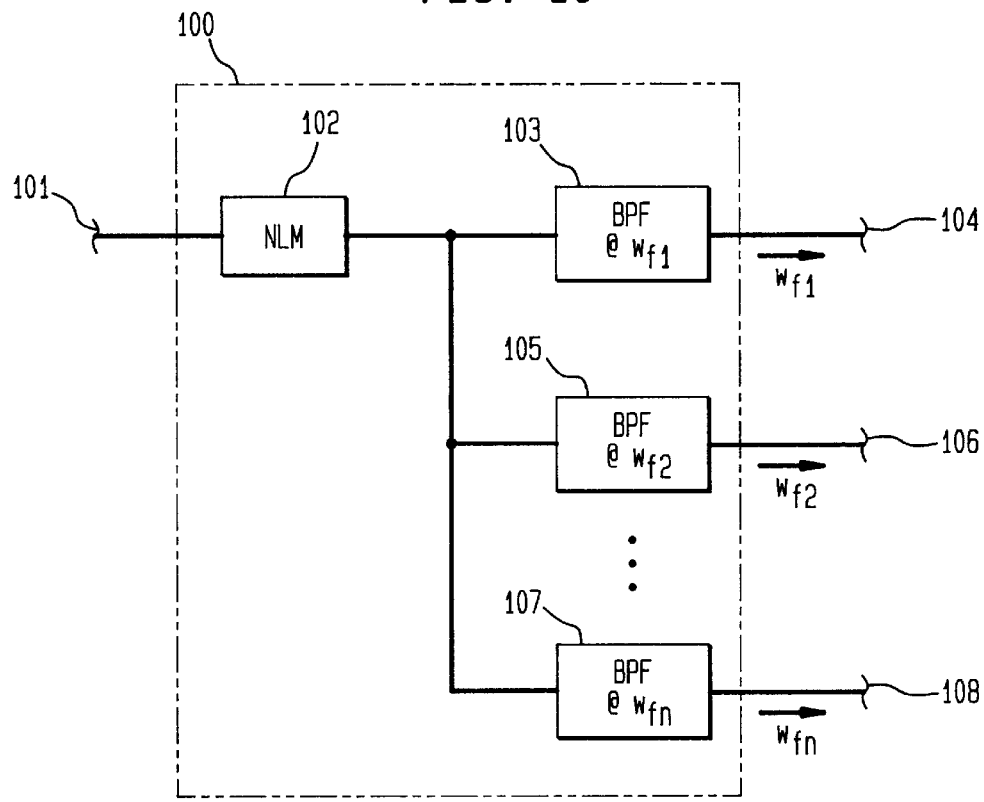
FIG. 10 is a diagram of an exemplary embodiment of an all-optical signal regenerator incorporating a plurality of regenerating optical filters.

FIG. 10 is a diagram of an exemplary embodiment of an all-optical signal regenerator 100 incorporating a plurality of optical regenerator bandpass filters (ORBPFs). Regenerator signal inlet port 101 is coupled to receive a RZ optical data stream from a transmission medium. The regenerator signal inlet port 101 is coupled to the inlet of a NLM 102. The outlet of the NLM 102 is coupled to the inlets of a plurality of ORBPFs 103,105,107, each ORBPF having a unique and discrete center frequency and each ORBPF center frequency being other than the input data carrier frequency of $\omega_0$. The output of each of the plurality of ORBPFs are then coupled to a plurality of respective regenerator signal outlet ports 104,106,108.

The regenerator signal inlet port 101 receives a RZ optical data stream, at an input signal carrier frequency ($\omega_0$), from the transmission medium. The NLM 102, over which the data stream is transmitted, produces an SPM-broadened spectrum, centered around $\omega_0$, which is then subjected to the plurality of ORBPFs 103,105,107 with respective center frequencies $\omega_{f1}$, $\omega_{f2}$, and $\omega_{f3}$. Each respective outlet of the plurality of ORBPFs is coupled to each of a plurality of respective regenerator signal outlet ports 104,106,108. By selecting two or more spectral bands at the output of the NLM 102, regenerated signals are available simultaneously at a plurality of wavelengths.

Figure 11:
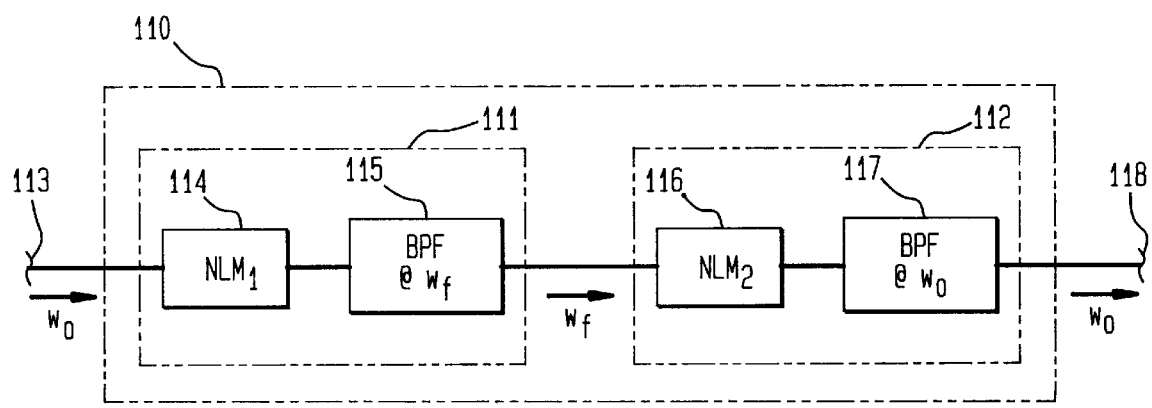
FIG. 11 is a diagram of an exemplary embodiment of an all-optical signal regenerator utilizing a two-stage regeneration scheme.

FIG. 11 is a diagram of an exemplary embodiment of an all-optical signal regenerator 110 utilizing a two-stage regeneration scheme. Regenerator signal inlet port 113 is coupled to receive a RZ optical data stream from a transmission medium. The regenerator signal inlet port 113 is coupled to the inlet of a first nonlinear medium (NLM$_1$) 114. The outlet of the NLM$_1$ 114 is coupled to the inlet of a first ORBPF 115, the first ORBPF 115 having a center frequency of $\omega_f$. The outlet of the first ORBPF 115 (at a center frequency of $\omega_f$) is coupled to a second nonlinear medium (NLM$_2$) 116. The outlet of the NLM$_2$ 116 is coupled to the inlet of a second ORBPF 117, the second ORBPF 117 having a center frequency of $\omega_0$. The combination of the NLM$_1$ 114 and the first ORBPF 115 (at a center frequency of $\omega_f$) comprise the first stage regenerator 111 of the two-stage regeneration scheme. The combination of the NLM$_2$ 116 and the second ORBPF 117 (at a center frequency of $\omega_0$) comprise the second stage regenerator 112 of the two-stage regeneration scheme. The outlet of the second ORBPF 117 is then coupled to a regenerator signal outlet port 118.

The regenerator signal inlet port 113 receives a RZ optical data stream, at an input signal carrier frequency ($\omega_0$), from the transmission medium. The $NLM_1$ 114, over which the data stream is transmitted, produces an SPM-broadened spectrum centered around $\omega_0$ which is then subjected to the first ORBPF 115 (at a center frequency of $\omega_f$), producing a first stage regenerated signal shifted in frequency by $\Delta\omega_{shift}$. The $NLM_2$ 116 accepts the regenerated output from the first stage regenerator 111 and passes the regenerated data stream thereover, producing an SPM-broadened spectrum centered around $\omega_f$ which is then subjected to the second ORBPF 117 (at a center frequency of $\omega_0$), producing a second stage regenerated signal shifted in frequency by $-\Delta\omega_{shift}$, thus preserving the original signal frequency $\omega_0$. Use of optical amplifiers to boost signal intensity so that a NLM causes an appropriate degree of SPM spectrum broadening prior to the first stage, the second stage, or both stages may be incorporated; and similarly, application of optical bandpass filters to suppress broadband noise prior to regeneration may be incorporated, as previously illustrated and described, and as would be apparent to those skilled in the art.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. An all-optical signal regenerator utilized for regeneration of a return-to-zero digital data stream transported over a transmission medium, said data stream encompassing a plurality of input signal pulses, each of said plurality of input signal pulses having an input signal pulse intensity ($I_p$), said data stream having an input signal data carrier center frequency ($\omega_0$) and an input signal data carrier bandwidth ($\Delta\omega_0$), said regenerator comprising:

a nonlinear medium (NLM) having a NLM inlet and a NLM outlet, said NLM inlet operable to accept said data stream from said transmission medium, said NLM utilizing the effect of self-phase modulation (SPM) to induce a signal spectral bandwidth broadening in said plurality of input signal pulses; and an optical regenerator bandpass filter (ORBPF) having an ORBPF inlet and an ORBPF outlet, said ORBPF inlet coupled with said NLM outlet, said ORBPF having an ORBPF center frequency ($\omega_f$) and an ORBPF bandwidth ($\Delta\omega_f$), said $\Delta\omega_f$ selected to pass frequencies other than said $\omega_0$, wherein said ORBPF outlet provides a "set" value for each pulse of said plurality of input signal pulses for which said $I_p$ is greater than a critical pulse intensity ($I_{CR}$) and said ORBPF outlet provides a "null" value for each pulse of said plurality of input signal pulses for which said $I_p$ is less than said $I_{CR}$.

2. The regenerator in accordance with claim 1 wherein said NLM is comprised of optical fiber.

3. The regenerator in accordance with claim 1 wherein said transmission medium also functions as said NLM.

4. The regenerator in accordance with claim 1 wherein said $\Delta\omega_f$ is selected to approximate said $\Delta\omega_0$.

5. The regenerator in accordance with claim 1 wherein said regenerator is also utilized for data stream wavelength conversion.

6. The regenerator in accordance with claim 1 wherein said regenerator is a multiple-stage regenerator.

7. The regenerator in accordance with claim 6 wherein said multiple-stage regenerator is a two-stage regenerator.

8. The regenerator in accordance with claim 7 wherein a first-stage of said two-stage regenerator provides a first-stage output at said $\omega_f$, and said second-stage of said two-stage regenerator provides a second-stage output at said $\omega_0$.

9. The regenerator in accordance with claim 1 wherein said $\Delta\omega_f$ is selected to approximate said $\Delta\omega_0$.

10. The regenerator in accordance with claim 1 further comprising a plurality of optical regenerator bandpass filters (ORBPFs), said plurality of ORBPFs providing a regenerated signal output at a respective plurality of output signal wavelengths.

11. The regenerator in accordance with claim 1 further comprising a noise-rejecting optical bandpass filter (NROBPF) centered at input signal frequency, said NROBPF utilized to suppress broadband spectral noise prior to regeneration.

12. The regenerator in accordance with claim 11 further comprising an optical amplifier, said optical amplifier utilized to amplify said input signal pulse intensity ($I_p$) to a level for which a broadened signal spectral bandwidth ($\Delta\omega_{SPM}$) is sufficiently large to encompass frequencies included within the transmission band of said ORBPF.

13. The regenerator in accordance with claim 1 further comprising an optical amplifier, said optical amplifier utilized to amplify said input signal pulse intensity ($I_p$) to a level for which a broadened signal spectral bandwidth ($\Delta\omega_{SPM}$) is sufficiently large to encompass frequencies included within the transmission band of said ORBPF.

14. A method for an all-optical regeneration of a return-to-zero digital data stream transported over a transmission medium, said data stream encompassing a plurality of input signal pulses, each of said plurality of input signal pulses having an input signal pulse intensity ($I_p$), said data stream having an input signal data carrier center frequency ($\omega_0$) and an input signal data carrier bandwidth ($\Delta\omega_0$), said method comprising the steps of:

transmitting said data stream through a nonlinear medium (NLM), thereby producing signal spectral bandwidth broadening in said plurality of input signal pulses due to the effect of self-phase modulation (SPM); and filtering said data stream through an optical regenerator bandpass filter (ORBPF) having an ORBPF bandwidth ($\Delta\omega_f$) and an ORBPF transmission band, wherein said ORBPF transmission band encompasses frequencies unique and distinct from said input signal data carrier center frequency ($\omega_0$), wherein said ORBPF passes a "set" output value for each pulse of said plurality of input signal pulses for which said $I_p$ is greater than a critical pulse intensity ($I_{CR}$) and said ORBPF passes a "null" output value for each pulse of said plurality of input signal pulses for which said $I_p$ is less than said $I_{CR}$.

15. The method in accordance with claim 14 wherein said NLM is comprised of optical fiber.

16. The method in accordance with claim 14 wherein said transmission medium also functions as said NLM.

17. The method in accordance with claim 16 wherein said $\Delta\omega_f$ is selected to approximate said $\Delta\omega_0$.

18. The method in accordance with claim 14 wherein said all-optical regeneration is further utilized to accomplish data stream wavelength conversion.

19. The method in accordance with claim 14 wherein said filtering step is accomplished utilizing a plurality of optical regenerator bandpass filters (ORBPFs), said plurality of ORBPFs providing a regenerated signal output at a respective plurality of output signal wavelengths.

20. The method in accordance with claim 14 further comprising the step of suppressing broadband spectral noise prior to said step of transmitting said data stream through said NLM, wherein said step of suppressing broadband spectral noise is accomplished utilizing a bandpass filter with a center bandpass frequency of said $\omega_0$.

21. The method in accordance with claim 20 further comprising the step of amplifying said plurality of input signal pulses within said data stream prior to said step of transmitting said data stream through said NLM, said amplifying step utilized to amplify said $I_p$ to a level for which a broadened signal spectral bandwidth ($\Delta\omega_{SPM}$) is sufficiently large to encompass frequencies included within the transmission band of said ORBPF.

22. The method in accordance with claim 14 further comprising the step of amplifying said plurality of input signal pulses within said data stream prior to said step of transmitting said data stream through said NLM, said amplifying step utilized to amplify said $I_p$ to a level for which a broadened signal spectral bandwidth ($\Delta\omega_{SPM}$) is sufficiently large to encompass frequencies included within the transmission band of said ORBPF.

* * * * *